United States Patent Office 3,773,713
Patented Nov. 20, 1973

3,773,713
THERMOSTABLE COMPOSITION OF VINYLIDENE FLUORIDE POLYMER
Shun Koizumi, Toyonaka, Takeshi Suzuki, Kyoto-fu, and Chuzo Okuno, Settsu, Japan, assignors to Daikin Koygo Co., Ltd., Osaka, Japan
No Drawing. Continuation of abandoned application Ser. No. 35,297, May 6, 1970. This application May 24, 1972, Ser. No. 256,258
Claims priority, application Japan, May 6, 1969, 44/35,059; Dec. 5, 1969, 44/98,130
Int. Cl. C08f 45/04, 45/26
U.S. Cl. 260—30.2            22 Claims

ABSTRACT OF THE DISCLOSURE

A thermostable composition comprising 100 parts by weight of vinylidene fluoride polymer and 0.1 to 30 parts by weight of at least one glycidyl compound selected from the group consisting of glycidyl methacrylate polymers and glycidyl epoxy resins with or without a pigment and an organic solvent system. The film of the composition coated on a metal plate is highly and satisfactorily improved in the thermostability and the adhesive property, even when a pigment is contained therein.

---

This is a continuation of application Ser. No. 35,297, filed May 6, 1970, which is now abandoned.

The present invention relates to a thermostable composition of vinylidene fluoride polymer. More particularly, it relates to an improvement in the thermostability of vinylidene fluoride polymer.

Since vinylidene fluoride polymer has a good weather-proof property and is excellent in various physical properties such as elasticity and hardness, it has been widely used, for instance, as a coating material or a film-forming material.

In spite of the said favorable properties, there is a serious disadvantage that, when vinylidene fluoride polymer is heated at such a high temperature as usually applied on molding and baking, yellow to brown coloration is apt to occur with deterioration of physical properties. This unfavorable inclination is particularly seen in the coexistence of an organic or inorganic pigment. Therefore, for instance, coating the surface of a metal plate which ordinarily requires a high temperature of more than 200° C., particularly more than 240° C., for assuring the strong and firm adhesion of a film thereon cannot be successfully accomplished with a composition of vinylidene fluoride polymer incorporated with a pigment.

It has now been found that the incorporation of a glycidyl compound selected from the group consisting of glycidyl methacrylate polymers and glycidyl epoxy resins into a composition of vinylidene fluoride polymer increases the thermostability of the vinylidene fluoride polymer with improvement of the adhesive property on a metal plate. It is notable that such increase and improvement can be seen even when the composition contains a pigment.

Accordingly, a basic object of the present invention is to embody a thermostable composition of vinylidene fluoride polymer. Another object of this invention is to embody a thermostable coating composition of vinylidene fluoride polymer incorporated with a pigment. A further object of the invention is to embody a method for improving the thermostability of vinylidene flouride polymer. These and other objects will be apparent to those conversant with the art to which the present invention pertains from the subsequent descriptions.

According to the present invention, there is provided a composition which comprises vinylidene fluoride polymer and at least on glycidyl compound selected from the group consisting of glycidyl methacrylate polymers and glycidyl epoxy resins.

The term "vinylidene fluoride polymer" herein used is intended to mean a polymer mainly consisting of vinylidene fluoride unit and includes not only a homopolymer of vinylidene fluoride but also a copolymer of vinylidene fluoride with one or more of polymerizable monomers having ethylenic unsaturation (e.g. trifluorochloroethylene, vinyl fluoride, trifluoroethylene, tetrafluoroethylene, hexafluoropropylene, ethylene, propylene, isobutylene, styrene, vinyl chloride, vinylidene chloride).

The term "glycidyl methacrylate polymer" is intended to mean a polymer mainly consisting of glycidyl methacrylate unit, i.e. the one containing not less than 50% by weight (preferably not less than 70% by weight) of glycidyl methacrylate unit and includes not only a homopolymer of glycidyl methacrylate but also a copolymer of glycidyl methacrylate with one or more of polymerizable monomers having ethylenic unsaturation (e.g. methyl acrylate, methyl methacrylate, ethyl acrylate, ethyl methacrylate, butyl methacrylate, vinyl acetate, styrene, ethylene, vinyl chloride, vinyl propionate).

The term "glycidyl epoxy resin" is intended to mean an epoxy resin having a glycidyl group

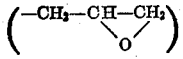

the epoxy resin being the primary condensate of a compound having at least one epoxy group in average in the molecule and includes the compounds as exemplified in Table 1:

TABLE 1

| Classification | Name | Structure — Example |
|---|---|---|
| Aliphatic diglycidyl ethers. | Diglycidyl ether | CH₂—CH—CH₂—O—CH₂—CH—CH₂ (with epoxide O on each terminal CH₂—CH) |
| | Diglycidyl ether of butanediol. | CH₂—CH—CH₂—O—(CH₂)₄—O—CH₂—CH—CH₂ (with epoxide O on each terminal) |
| | Diglycidyl ether of polypropyleneglycol. | CH₂—CH—CH₂—O—[CH—CH₂—O]—CH₂—CH—CH₂ (CH₃ branch; epoxide O on each terminal) |
| Aromatic diglycidyl ethers. | Diglycidyl ether of bisphenol A. | CH₂—CH—CH₂—[O—C₆H₄—C(CH₃)₂—C₆H₄—O—CH₂—CH(OH)—CH₂—]— (epoxide on terminal) |

TABLE I—Continued

| Classification | Name | Structure (Example) |
|---|---|---|
| | | (Diglycidyl ether of bisphenol A structure) |
| | Diglycidyl ether of resorcinol. | (structure) |
| Aliphatic diglycidyl esters. | Diglycidyl ester of linolein dimer acid. | (structure) |
| Aliphatic triglycidyl ethers. | Triglycidyl ether of glycerol. | (structure) |
| Aromatic triglycidyl ethers. | Triglycidyl ether of trihydroxyphenylpropane. | (structure) |
| Aromatic triglycidyl ether/ester. | Glycidyl ester of 4,4-bis(4-glycidyloxyphenyl)pentanoic acid. | (structure) |
| Aliphatic polyglycidyl ethers. | Polyallylglycidyl ether | (structure) |
| Aromatic polyglycidyl ethers. | Tetraglycidyl ether of tetrakishydroxyphenylethane. | (structure) |
| | Epoxynovolak | (structure), $n = 0-6$ |

In addition to the above essential components, i.e. the vinylidene fluoride polymer and at least one glycidyl compound, the composition of the invention may contain an organic solvent system for dissolving or dispersing the essential components therein. Such organic solvent system may consist of a single organic solvent affording a crystal melting point lower than 160° C. to the vinylidene fluoride polymer such as diethylformamide, propylenecarbonate, dimethyl succinate, tetraethylurea, triethylphosphate, dimethylacetamide, tetramethylurea, diethylacetamide or dimethylsulfoxide. However, the use of a mixture consisting of at least one organic solvent affording a crystal melting point higher than 160° C. to the vinylidene fluoride polymer and having a boiling point higher than 180° C. (e.g. dibutyl phthalate, propyleneglycol, diethyleneglycol, triethyleneglycol, Tetralin, dibutyl Carbitol) and at least one organic solvent affording a crystal melting point lower than 90° C. to the vinylidene fluoride polymer (e.g. N-methyl-2-pyrrolidone, dimethylformamide, dimethylacetamide, hexamethylphosphoramide) in a weight ratio from 50:50 to 95:5 with or without any other organic solvent such as xylene, isoamyl acetate, n-butyl ether, ethyl Cellosolve, toluene, methyl isobutyl ketone, methyl Cellosolve, isoamyl alcohol or n-butyl acetate is particularly recommended for obtaining a dispersion of high stability. In order to utilize the composition for coating, the presence of the organic solvent system as above recommended or any other solvent system is essential.

The composition may also include any organic or inorganic pigment (e.g. titanium dioxide, cadmium red, cadmium yellow, phthalocyanine green, phthalocyanine blue, red iron oxide).

As the heat stabilizer for the vinylidene fluoride polymer, the glycidyl methacrylate polymer and the glycidyl epoxy resin are both effective. Even when a pigment is incorporated, their stabilization effect is highly appreciable and satisfactory. In general, however, the use of the glycidyl methacrylate polymer is advantageous in improving considerably the adhesion property of the vinylidene fluoride polymer.

When the glycidyl methacrylate is employed, 0.5 to 30 parts by weight (favorably 1 to 20 parts by weight) to 100 parts by weight of the vinylidene fluoride polymer are appropriate. For the glycidyl epoxy resin, 0.1 to 30 parts by weight (preferably 1 to 20 parts by weight) are a suitable amount to 100 parts by weight of the vinylidene fluoride polymer. Thus, the amount of the glycidyl compound to be used may be generally from 0.1 to 30 parts by weight to 100 parts by weight of the vinylidene fluoride polymer.

Preparation of the composition may be effected by a conventional procedure. For instance, the vinylidene fluoride polymer in powdery form and the glycidyl compound, if necessary, with a pigment and/or an organic solvent system may be mixed by the aid of an appropriate mechanical agitation means (e.g. blender, kneader, Banbury mixer, ball mill, paint mill) to make a uniform composition. In alternative, the former two or three may be mixed and, after addition of an organic solvent system thereto, agitated to make a uniform composition.

As stated above, the composition of the present invention is advantageous in showing no deterioration of the physical properties even when a high temperature is applied, for instance, on molding (e.g. injection molding, extrusion molding, casting molding) or baking on a substrate. It is particularly advantageous that the composition applied as a coating material on a substrate such as a metal plate can form a film firmly adhered thereon.

Practical and presently preferred embodiments of the present invention are illustratively shown in the following examples wherein parts and percent are by weight.

EXAMPLE 1

In a glass-made vessel, there are charged polyvinylidene fluoride powder (intrinsic viscosity [η] at 35° C. in dimethylacetamide, 210 (ml./g.); particle size, 0.35μ) (10 parts), titanium dioxide ("Tioxide R–CR3" manufactured by British Titanium Products Co.) (4 parts), a mixture of dibutyl phthalate (36%), N-methyl-2-pyrrolidone (24%), xylene (30%) and dimethylacetamide (10%) (26 parts) and 50% methyl isobutyl ketone solution of diglycidyl ether of bisphenol A (0.02, 0.1, 0.2, 1.0, 2.0, 4.0 or 6.0 parts), and the resultant mixture is mixed well in the presence of glass beads for 30 minutes to obtain a uniform dispersion of polyvinylidene fluoride.

The dispersion is spread out with a knife coater on an aluminum plate of 0.5 mm. thickness, and the plate is heated at 250° C. or 270° C. for 10 minutes in an electric furnace. The coloration degree of the resultant film is judged according to the criteria described in Table 3 and the results are shown in Table 4.

The film obtained in the same manner as above but adding no diglycidyl ether of bisphenol A or incorporating 1, 5 or 10 parts of monobutyl glycidyl ether ("Araldite DY 021" manufactured by Ciba Product Co.), glycidyl methacrylate or allyl glycidyl ether per 100 parts of polyvinylidene fluoride powder and heating at 250° C. for 10 minutes affords the coloration degree of 1.

TABLE 2

| Trade name | Manufacturer | Epoxy equivalence |
|---|---|---|
| Epikote 834 | Shell Int. Chem. Corp | 172–179 |
| Epikote 1001 | do | 230–280 |
| Epikote 1004 | do | 450–550 |
| Epikote 1007 | do | 875–1,025 |

TABLE 3

| Mark: | Coloration degree |
|---|---|
| 6 | White. |
| 5 | Pale light gray. |
| 4 | Pale yellow. |
| 3 | Light yellow. |
| 2 | Yellow. |
| 1 | Light yellow brown to brown. |

TABLE 4

| Heat stabilizer | Baking condition °C. | Minutes | Amount [1] (parts)—Coloration degree | | | | | |
|---|---|---|---|---|---|---|---|---|
| | | | 0.1 | 0.5 | 1 | 5 | 10 | 20 | 30 |
| Epikote 834 | 250 | 10 | 4 | 5 | 6 | 6 | 6 | 5 | 5 |
| Epikote 1001 | 250 | 10 | 1 | 5 | 6 | 6 | 6 | 6 | 6 |
| Epikote 1004 | 250 | 10 | 3 | 5 | 6 | 6 | 6 | 6 | 6 |
| Epikote 1007 | 250 | 10 | 2 | 5 | 6 | 6 | 6 | 6 | 6 |
| Epikote 834 | 270 | 10 | 1 | 5 | 5 | 5 | 5 | 5 | 5 |
| Epikote 1001 | 270 | 10 | | 5 | 5 | 5 | 5 | 5 | 5 |
| Epikote 1004 | 270 | 10 | 1 | 5 | 5 | 5 | 5 | 5 | 5 |
| Epikote 1007 | 270 | 10 | 1 | 5 | 5 | 5 | 5 | 5 | 5 |

[1] Parts per 100 parts of polyvinylidene fluoride powder.

As can be seen in the above table, the heat stabilizer of the invention is quite effective even at a high temperature, i.e. 270° C., over the practically adopted temperature when it is used in an appropriate amount.

EXAMPLE 2

A dispersion of polyvinylidene fluoride is obtained as in Example 1 but employing as the heat stabilizer polyglycidyl ether of phenol-formaldehyde-novolak ("Epikote 152" manufactured by Shell Int. Chem. Corp.; epoxy equivalence, 2000 to 2500; viscosity, 1400 to 2000 cp. at 52° C.) in the amount of 0.1, 0.5, 1.5 or 10 parts per 100 parts of polyvinylidene fluoride powder.

The film is prepared from the dispersion as in Example 1 and its coloration degree is shown in Table 5.

TABLE 5

| Heat stabilizer | Baking condition | | Amount¹ (parts)—Coloration degree | | | | |
|---|---|---|---|---|---|---|---|
| | °C. | Minutes | 0.1 | 0.5 | 1 | 5 | 10 |
| Epikote 152 | 250 | 10 | 2 | 6 | 5 | 4 | 3 |
| | 270 | 10 | | 5 | 3 | 2 | |

See footnote (1) bottom of Table 4.

EXAMPLE 3

A dispersion of polyvinylidene fluoride is obtained as in Example 1 but employing as the heat stabilizer diglycidyl ether of polypropylene glycol ("Araldite NER 400A" manufactured by Ciba Product Co.) in the amount of 0.1, 0.5, 1, 5, 10 or 20 parts per 100 parts of polyvinylidene fluoride powder.

The film is prepared from the dispersion as in Example 1 and its coloration degree is shown in Table 6.

TABLE 6

| Heat stabilizer | Baking condition | | Amount¹ (parts)—Coloration degree | | | | | |
|---|---|---|---|---|---|---|---|---|
| | °C. | Minutes | 0.1 | 0.5 | 1 | 5 | 10 | 20 |
| Araldite NER400A | 250 | 10 | 1 | 5 | 5 | 4 | 3 | 2 |
| | 270 | 10 | | 5 | 4 | 2 | | |

See footnote (1) bottom of Table 4.

EXAMPLE 4

A dispersion of polyvinylidene fluoride is obtained as in Example 1 but employing as the heat stabilizer diglycidyl ether of 1,4-butanediol ("Araldite DYO 22" manufactured by Ciba Product Co.) in the amount of 0.5, 1, 5, 10, 20 or 30 parts per 100 parts of polyvinylidene fluoride powder.

The film is prepared from the dispersion as in Example 1 and its coloration degree is shown in Table 7.

TABLE 7

| Heat stabilizer | Baking condition | | Amount¹ (parts)—Coloration degree | | | | | |
|---|---|---|---|---|---|---|---|---|
| | °C. | Minutes | 0.5 | 1 | 5 | 10 | 20 | 30 |
| Araldite DYO22 | 250 | 10 | 3 | 4 | 6 | 6 | 6 | 5 |
| | 270 | 10 | | 2 | 5 | 6 | 5 | 4 |

See footnote (1) bottom of Table 4.

EXAMPLE 5

A dispersion of polyvinylidene fluoride is obtained as in Example 1 but employing as the heat stabilizer polyglycidyl ether of o-cresol-formaldehyde-novolak ("Araldite ECN 1235" manufactured by Ciba Product Co.) in the amount of 0.1, 0.5, 1, 5 or 10 parts per 100 parts of polyvinylidene fluoride powder.

The film is prepared from the dispersion as in Example 1 and its coloration degree is shown in Table 8.

TABLE 8

| Heat stabilizer | Baking condition | | Amount¹ (parts)—Coloration degree | | | | |
|---|---|---|---|---|---|---|---|
| | °C. | Minutes | 0.1 | 0.5 | 1 | 5 | 10 |
| Araldite ECN 1235 | 250 | 10 | 1 | 5-6 | 4-5 | 2 | 1 |
| | 270 | 10 | 1 | 5 | 2 | 1 | |

¹ See footnote (1) bottom of Table 4.

EXAMPLE 6

A dispersion of polyvinylidene fluoride is obtained as in Example 1 but employing as the heat stabilizer diglycidyl ether of resorcinol ("Araldite ERE 1359" manufactured by Ciba Product Co.) in the amount of 0.1, 0.5, 1, 5, 10, 20 or 30 parts per 100 parts polyvinylidene fluoride powder.

The film is prepared from the dispersion as in Example 1 and its coloration degree is shown in Table 9.

TABLE 9

| Heat stabilizer | Baking condition | | Amount¹ (parts)—coloration degree | | | | | | |
|---|---|---|---|---|---|---|---|---|---|
| | °C. | Minutes | 0.1 | 0.5 | 1 | 5 | 10 | 20 | 30 |
| Araldite ERE 1359 | 250 | 10 | 3 | 4 | 6 | 6 | 6 | 6 | 6 |
| | 270 | 10 | | 1 | 5 | 5 | 4 | 4 | 4 |

¹ See footnote (1) bottom of Table 4.

EXAMPLE 7

A dispersion of polyvinylidene fluoride is obtained as in Example 1 but employing as the heat stabilizer triglycidyl ether of glycerol ("Epikote 812" manufactured by Shell Int. Chem. Corp.) in the amount of 0.1, 0.5, 1, 5, 10, 20 or 30 parts per 100 parts of polyvinylidene fluoride powder.

The film is prepared from the dispersion as in Example 1 and its coloration degree is shown in Table 10.

TABLE 10

| Heat stabilizer | Baking condition | | Amount¹ (parts)—coloration degree | | | | | | |
|---|---|---|---|---|---|---|---|---|---|
| | °C. | Minutes | 0.1 | 0.5 | 1 | 5 | 10 | 20 | 30 |
| Epikote 812 | 250 | 10 | 5 | 6 | 6 | 6 | 6 | 6 | 3 |
| | 270 | 10 | 1 | 3 | 6 | 6 | 4 | 3 | 1 |

¹ See footnote (1) bottom of Table 4.

EXAMPLE 8

In a glass-made vessel, there are charged polyvinylidene fluoride powder (intrinsic viscosity [η] at 35° C. in dimethylacetamide, 162 (ml./g.); particle size, 0.40μ) (100 parts), titanium dioxide ("Tioxide R-CR3" manufactured by British Titanium Products Co.) (33 parts) and a mixture of N-methyl-2-pyrrolidone (24%), dibutyl phthalate (36%), xylene (30%) and dimethylacetamide (10%) (267 parts). The resultant mixture is shaken for an hour with a paint mill. The thus obtained dispersion of polyvinylidene fluoride [I] is admixed with a solution of glycidyl methacrylate polymer (as obtained in Reference Example 1) in methyl ethyl ketone at a rate of 1, 2, 4, 10 or 20 parts of the glycidyl methacrylate polymer to 100 parts of the polyvinylidene fluoride and then stirred. The dispersion of polyvinylidene fluoride is spread out with a knife coater on an aluminum plate (0.5 mm. thickness) treated with Bondelite No. 721 and baked at 250° C. or 265° C. for 15 minutes in an electric furnace to make a film of 0.25 to 0.30μ. The coloration degree of the film is judged by macroscopic observation and the adhesive property of the film is determined by the cross cut Erichsen test (extrusion, 6 mm.) and the scratching test with a stylus (charge, 500 g.). The results are shown in Table 11.

TABLE 11

| Amount of heat stabilizer (parts) | Baking condition | | Coloration degree | Cross cut, Erichsen test | Scratching test |
|---|---|---|---|---|---|
| | °C. | Minutes | | | |
| 0 | 250 | 15 | 1 | Peeled | Peeled. |
| 1 | 250 | 15 | 5-6 | Not peeled | Slightly peeled. |
| 2 | 250 | 15 | 6 | do | Do. |
| 4 | 250 | 15 | 6 | do | Do. |
| 10 | 250 | 15 | 6 | do | Do. |
| 20 | 250 | 15 | 6 | do | Do. |
| 1 | 265 | 15 | 5 | do | Do. |
| 2 | 265 | 15 | 5 | do | Do. |
| 4 | 265 | 15 | 5-6 | do | Do. |
| 10 | 265 | 15 | 6 | do | Do. |
| 20 | 265 | 15 | 6 | do | Do. |

EXAMPLE 9

The dispersion of polyvinylidene fluoride [I] as in Example 8 is admixed with glycidyl methacrylate polymer (as obtained in Reference Example 1) at a rate of 2, 4 or 10 parts of the glycidyl methacrylate polymer to 100 parts of the polyvinylidene fluoride and then stirred. The dispersion of polyvinylidene fluoride thus obtained is spread out with a knife coater on an aluminum plate (0.5 mm. thickness) and baked at 250° C. for 15 minutes in an electric furnace to make a film of 0.25 to 0.30μ thickness. The coloration degree and the adhesive property of the film are judged as in Example 8. The results are shown in Table 12.

TABLE 12

| Amount of heat stabilizer (parts) | Coloration degree | Cross cut Erichsen test | Scratching test |
|---|---|---|---|
| 0 | 1 | Peeled | Peeled |
| 2 | 6 | Not peeled | Slightly peeled. |
| 4 | 6 | ---do--- | Not peeled. |
| 10 | 6 | ---do--- | Do. |

EXAMPLE 10

In a glass-made vessel, there are charged polyvinylidene fluoride powder (100 parts) and the solvent mixture (150 parts) as in Example 8, and the resultant mixture is shaken in a paint mill for an hour. The dispersion of polyvinylidene fluoride [II] is admixed with a solution of glycidyl methacrylate polymer (as obtained in Reference Example 1) in methyl ethyl ketone at a rate of 5 or 10 parts of the glycidyl methacrylate polymer to 100 parts of polyvinylidene fluoride and then stirred. The dispersion of polyvinylidene fluoride thus obtained is spread out with a knife coater on an aluminum plate (0.5 mm. thickness) and baked at 250° C. for 15 minutes in an electric furnace to make a film of 0.25 to 0.30μ thickness. The transparency of the film is judged by macroscopic observation and the adhesive property of the film is determined by the cross cut Erichsen test and the scratching test with a stylus. The results are shown in Table 13.

TABLE 13

| Amount of heat stabilizer (parts) | Transparency | Cross cut Erichsen test | Scratching test |
|---|---|---|---|
| 0 | Transparent | Peeled | Peeled. |
| 5 | ---do--- | Not peeled | Not peeled. |
| 10 | ---do--- | ---do--- | Do. |

EXAMPLE 11

The dispersion of polyvinylidene fluoride [I] as in Example 8 is admixed with a solution of glycidyl methacrylate-vinyl acetate copolymer (as obtained in Reference Example 2) in methyl ethyl ketone at a rate of 1, 2, 4, 10 or 20 parts of the copolymer to 100 parts of the polyvinylidene fluoride and then stirred. The dispersion of polyvinylidene fluoride thus obtained is spread out on an aluminum plate (0.5 mm. thickness) and baked in the same manner as in Example 8. The coloration degree and the adhesive property of the film are judged as in Example 8. The results are shown in Table 14.

TABLE 14

| Amount of heat stabilizer (parts) | Baking condition ° C. | Baking condition Minutes | Coloration degree | Cross cut Erichsen test | Scratching test |
|---|---|---|---|---|---|
| 1 | 250 | 15 | 6 | Not peeled | Slightly peeled. |
| 2 | 250 | 15 | 6 | ---do--- | Not peeled. |
| 4 | 250 | 15 | 6 | ---do--- | Do. |
| 10 | 250 | 15 | 6 | ---do--- | Do. |
| 20 | 250 | 15 | 6 | ---do--- | Do. |
| 1 | 265 | 15 | 5 | ---do--- | Slightly peeled. |
| 2 | 265 | 15 | 6 | ---do--- | Not peeled. |
| 4 | 265 | 15 | 6 | ---do--- | Do. |
| 10 | 265 | 15 | 6 | ---do--- | Do. |
| 20 | 265 | 15 | 5 | ---do--- | Do. |

EXAMPLE 12

The dispersion of polyvinylidene fluoride [I] as in Example 8 is admixed with a solution of glycidyl methacrylate-vinyl propionate copolymer (as obtained in Reference Example 2) in methyl ethyl ketone at a rate of 1, 2, 4, 10 or 20 parts of the copolymer to 100 parts of the polyvinylidene fluoride and then stirred. The dispersion of polyvinylidene fluoride thus obtained is spread out on an aluminum plate (0.5 mm. thickness) and baked in the same manner as in Example 8. The coloration degree and the adhesive property of the film are judged as in Example 8. The results are shown in Table 15.

TABLE 15

| Amount of heat stabilizer (parts) | Baking condition ° C. | Baking condition Minutes | Coloration degree | Cross cut Erichsen test | Scratching test |
|---|---|---|---|---|---|
| 1 | 250 | 15 | 6 | Not peeled | |
| 2 | 250 | 15 | 6 | ---do--- | Slightly peeled. |
| 4 | 250 | 15 | 6 | ---do--- | Do. |
| 10 | 250 | 15 | 6 | ---do--- | Not peeled. |
| 20 | 250 | 15 | 6 | ---do--- | Do. |
| 1 | 265 | 15 | 5 | ---do--- | Slightly peeled. |
| 2 | 265 | 15 | 5 | ---do--- | Do. |
| 4 | 265 | 15 | 5 | ---do--- | Do. |
| 10 | 265 | 15 | 5 | ---do--- | Do. |
| 20 | 265 | 15 | 4-5 | ---do--- | Not peeled. |

EXAMPLE 13

The dispersion of polyvinylidene fluoride [I] as in Example 8 is admixed with a solution of glycidyl methacrylate-methyl methacrylate copolymer (as obtained in Reference Example 2) in methyl etheyl ketone at a rate of 4 or 10 parts of the copolymer to 100 parts of the polyvinylidene fluoride and then stirred. The dispersion of polyvinylidene fluoride thus obtained is spread out on an aluminum plate (0.5 mm. thickness) and baked in the same manner as in Example 8. The coloration degree and the adhesive property of the film are judged as in Example 8. The results are shown in Table 16.

TABLE 16

| Amount of heat stabilizer (parts) | Baking condition ° C. | Baking condition Minutes | Coloration degree | Cross cut Erichsen test | Scratching test |
|---|---|---|---|---|---|
| 4 | 250 | 15 | 6 | Not peeled | Not peeled. |
| 10 | 250 | 15 | 6 | ---do--- | Do. |
| 4 | 265 | 15 | 5 | ---do--- | Do. |
| 10 | 265 | 15 | 5 | ---do--- | Do. |

EXAMPLE 14

The dispersion of polyvinylidene fluoride [II] as in Example 10 is admixed with a solution of glycidyl methacrylate-vinyl acetate copolymer or glycidyl methacrylate-vinyl propionate copolymer (as obtained in Reference Example 2) in methyl ethyl ketone at a rate of 2, 4, 10 or 20 parts of the copolymer to 100 parts of the vinylidene fluoride and then stirred. The dispersion of polyvinylidene fluoride is spread out on an aluminum plate (0.5 mm. thickness) and baked in the same manner as in Example 10. The coloration degree and the adhesive property of the film are judged as in Example 10. The results are shown in Table 17.

TABLE 17

| Heat stabilizer | Amount (parts) | Transparency | Cross cut Erichsen test | Scratching test |
|---|---|---|---|---|
| | 0 | Transparent | Completely peeled | Completely peeled |
| Glycidyl methacrylate-vinyl acetate copolymer. | 2 | do | Not peeled | Slightly peeled. |
| | 4 | do | do | Not peeled. |
| | 10 | do | do | Do. |
| | 20 | Very slightly dull | do | Do. |
| Glycidyl methacrylate-vinyl propionate copolymer. | 2 | Transparent | do | Slightly peeled. |
| | 4 | do | do | Not peeled. |
| | 10 | do | do | Do. |
| | 20 | Slightly dull | do | Do. |

EXAMPLE 15

In a glass-made vessel, there are charged polyvinylidene fluoride powder (intrinsic viscosity [$\eta$] at 35° C. in dimethylacetamide, 210 (ml./g.); particle size, 0.35$\mu$) (10 parts), dimethyl phthalate (12 parts), diisobutyl ketone (3 parts) and 50% methyl isobutyl ketone solution of diglycidyl ether of bisphenol A ("Epikote 1007" manufactured by Shell Int. Chem. Corp.) (0.1, 0.2, 1.0 or 2.0 parts), and the resultant mixture is mixed well in the presence of glass beads for 30 minutes to obtain a uniform dispersion of polyvinylidene fluoride. The dispersion is spread out with a knife coater on an aluminum plate of 0.5 mm. thickness, and the plate is heated at 250° C. or 270° C. for 10 minutes in an electric furnace. After taking out from the furnace, the plate is cooled in water at once. The film on the plate is colorless and transparent.

The glycidyl methacrylate polymer used as the heat stabilizer in this invention is preferred to be of relatively low molecular weight. Some of the preferred glycidyl methacrylate polymer may be prepared as follows:

REFERENCE EXAMPLE 1

Preparation of glycidyl methacrylate homopolymer

In a glass-made vessel, there are charged glycidyl methacrylate (30 g.) and diisopropyl peroxydicarbonate of the formula:

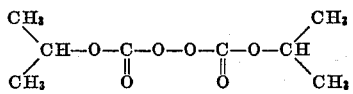

(30 g.), and the resultant mixture is heated at 40 to 60° C. to start the polymerization. When the viscosity is increased, the temperature is lowered to room temperature, and the reaction mixture is stirred occasionally to advance the polymerization. Subsequently, the reaction mixture is treated to form a precipitate. The precipitate is washed with water and dried at about 40° C. under reduced pressure. The dried precipitate is dissolved again in acetone, precipitated and dried to give white polymer. The polymer is soluble in methyl ethyl ketone, and the solution shows 47 ml./g. in intrinsic viscosity.

REFERENCE EXAMPLE 2

Preparation of glycidyl methacrylate copolymer

In a glass-made vessel, there are charged glycidyl methacrylate (21 g.), vinyl acetate (9 g.) and diisopropyl peroxydicarbonate (0.5 g.), and the polymerization is carried out in the same manner as in Reference Example 1 to give white copolymer. The formation of the copolymer is confirmed by comparing the infrared absorption spectrum of the copolymer with those of the homopolymers of each component monomer. The said copolymer is soluble in methyl ethyl ketone, and the solution shows 33 ml./g. in intrinsic viscosity.

In the same manner as above but using vinyl propionate and methyl methacrylate in place of vinyl acetate, there are obtained glycidyl methacrylate-vinyl propionate copolymer and glycidyl methacrylate-methyl methacrylate copolymer respectively having 27 ml./g. and 29 ml./g. in intrinsic viscosity.

What is claimed is:

1. A thermostable composition free of tin compounds consisting essentially of 100 parts by weight of vinylidene fluoride polymer mainly consisting of vinylidene fluoride units and 0.1 to 30 parts by weight of at least one glycidyl compound selected from the group consisting of glycidyl methacrylate polymers containing not less than 50% by weight of glycidyl methacrylate units and glycidyl epoxy resins which are the primary condensates of a compound having at least one epoxy group on an average in the molecule.

2. A thermostable composition consisting essentially of 100 parts by weight of vinylidene fluoride polymer mainly consisting of vinylidene fluoride units and 0.1 to 30 parts by weight of at least one glycidyl methacrylate polymer containing not less than 50% by weight of glycidyl methacrylate units.

3. The thermostable composition according to claim 2, wherein the glycidyl methacrylate polymer is used in an amount from 1 to 20 parts by weight to 100 parts of vinylidene fluoride polymer.

4. The thermostable composition according to claim 1, wherein the glycidyl compound is a glycidyl epoxy resin.

5. The thermostable composition according to claim 4, wherein the glycidyl epoxy resin is used in an amount from 1 to 20 parts by weight to 100 parts of vinylidene fluoride polymer.

6. The thermostable composition according to claim 1, wherein an organic solvent system is incorporated therein.

7. The thermostable composition according to claim 6, wherein the organic solvent system is a mixture of at least one organic solvent affording a crystal melting point higher than 160° C. to the vinylidene fluoride polymer and having a boiling point higher than 180° C. and at least one organic solvent affording a crystal melting point lower than 90° C. to the vinylidene fluoride polymer in a weight ratio from 50:50 to 95:5 with or without at least one of other organic solvents.

8. The theromstable composition according to claim 6, wherein a pigment is incorporated therein.

9. The thermostable composition according to claim 8, wherein the pigment is titanium dioxide.

10. The thermostable composition according to claim 1, wherein the glycidyl epoxy resins are selected from the group consisting of diglycidyl ether, diglycidyl ether of butanediol, diglycidyl ether of polypropyleneglycol, diglycidyl ether of bisphenol, diglycidyl ether of resorcinol, diglycidyl ester of linolein dimer acid, triglycidyl ether of glycerol, triglycidyl ether of trihydrocyphenylpropane, glycidyl ester of 4,4-bis(4-glycidyloxyphenyl) pentanoic acid, polyallylglycidyl ether, tetraglycidyl ether of tetraglycidyl ether of tetrakishydroxyphenylethane, and epoxynovolak.

11. The thermostable composition of claim 1, wherein said vinylidene fluoride copolymer is selected from the group consisting of a homopolymer and copolymer of vinylidene fluoride with at least one polymerizable monomer selected from the group consisting of trifluorochloroethylene, vinyl fluoride, trifluoroethylene, tetrafluoroethylene, hexafluoropropylene, ethylene, propylene, isobutylene, styrene, vinyl chloride, and vinylidene chloride, and glycidyl methacrylate polymer is selected from the group consisting of a homopolymer and a copolymer of glycidyl methacrylate and at least one polymerizable monomer selected from the group consisting of methyl acrylate, methyl methacrylate, ethyl acrylate, ethyl methacrylate, butyl methacrylate, vinyl acetate, styrene, ethylene, vinyl chloride, and vinyl propionate.

12. A method for thermostabilization of vinylidene fluoride polymer mainly consisting of vinylidene fluoride units which comprises incorporating a heat stabilizer free of tin compounds and consisting essentially of 0.1 to 30 parts by weight of at least one glycidyl compound selected from the group consisting of glycidyl methacrylate polymers containing not less than 50% by weight of glycidyl methacrylate units and primary condensates of compounds having at least one epoxy group in average in the molecule into 100 parts by weight of vinylidene fluoride polymer.

13. A method for thermostabilization of vinylidene fluoride polymer mainly consisting of vinylidene fluoride units which comprises incorporating 0.1 to 30 parts by weight of at least one glycidyl methacrylate polymer containing not less than 50% by weight of glycidyl methacrylate units into 100 parts by weight of vinylidene fluoride polymer.

14. The method according to claim 13, wherein the glycidyl methacrylate polymer is used in an amount from 1 to 20 parts by weight to 100 parts of vinylidene fluoride polymer.

15. The method according to claim 12, wherein the glycidyl compound is a glycidyl epoxy resin.

16. The method according to claim 15, wherein the glycidyl epoxy resin is used in an amount from 1 to 20 parts by weight to 100 parts of vinylidene fluoride polymer.

17. The method according to claim 12, wherein an organic solvent system is further incorporated in the resultant mixture.

18. The method according to claim 17, wherein the organic solvent system is a mixture of at least one organic solvent affording a crystal melting point higher than 160° C. to the vinylidene fluoride polymer and having a boiling point higher than 180° C. and at least one organic solvent affording a crystal melting point lower than 90° C. to the vinylidene fluoride polymer in a weight ratio from 50:50 to 95:5 with or without at least one of other organic solvents.

19. The method according to claim 17, wherein a pigment is further incorporated in the resultant mixture.

20. The method according to claim 19, wherein the pigment is titanium dioxide.

21. The method according to claim 12, wherein said vinylidene fluoride copolymer is selected from the group consisting of a homopolymer and a copolymer of vinylidene fluoride with at least one polymerizable monomer selected from the group consisting of trifluoroethylene, vinyl fluoride, trifluoroethylene, tetrafluoroethylene, hexafluoropropylene, ethylene, propylene, isobutylene, styrene, vinyl chloride, and vinylidene chloride, and the glycidyl methacrylate polymer is selected from the group consisting of a homopolymer and a copolymer of glycidyl methacrylate and at least one polymerizable monomer selected from the group consisting of methyl acrylate, methyl methacrylate, ethyl acrylate, ethyl methacrylate, butyl methacrylate, vinyl acetate, styrene, ethylene, vinyl chloride, and vinyl propionate.

22. The method according to claim 15, wherein the glycidyl epoxy resins are selected from the group consisting of diglycidyl ether, diglycidyl ether of butanediol, diglycidyl ether of polypropyleneglycol, diglycidyl ether of bisphenol, diglycidyl ether of resorcinol, diglycidyl ester of linolein dimer acid, triglycidyl ether of glycerol, triglycidyl ether of trihydroxyphenylpropane, glycidyl ester of 4,4-bis(4-glycidyloxyphenyl) pentanoic acid, polyallylglycidyl ether, tetraglycidyl ether of tetrakishydroxyphenylethene, and epoxynovolak.

References Cited

UNITED STATES PATENTS

| 3,252,929 | 5/1966 | Meyer | 260—836 X |
| 3,324,069 | 6/1967 | Koblitz et al. | 260—900 X |
| 3,111,426 | 11/1963 | Capron et al. | 260—837 R X |

LEWIS T. JACOBS, Primary Examiner

U.S. Cl. X.R.

260—30.6 R, 30.8 R, 31.8 F, 32.6 R, 32.8 R, 32.8 EP, 33.2 R, 33.2 EP, 33.4 F, 33.4 EP, 33.6 F, 33.6 EP, 37 EP, 41 R